United States Patent
Shimotono et al.

(10) Patent No.: US 10,318,047 B2
(45) Date of Patent: Jun. 11, 2019

(54) USER INTERFACE FOR ELECTRONIC DEVICE, INPUT PROCESSING METHOD, AND ELECTRONIC DEVICE

(71) Applicant: LENOVO (Singapore) PTE. LTD., New Tech Park (SG)

(72) Inventors: Susumu Shimotono, Hadano (JP); Ryohta Nomura, Yamato (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 222 days.

(21) Appl. No.: 15/241,508

(22) Filed: Aug. 19, 2016

(65) Prior Publication Data
US 2017/0060324 A1    Mar. 2, 2017

(30) Foreign Application Priority Data
Aug. 27, 2015 (JP) ................................. 2015-167570

(51) Int. Cl.
*G06F 3/041* (2006.01)
*G06F 3/033* (2013.01)
(Continued)

(52) U.S. Cl.
CPC ............ *G06F 3/0416* (2013.01); *G06F 3/033* (2013.01); *G06F 3/044* (2013.01);
(Continued)

(58) Field of Classification Search
CPC .... G06F 3/0416; G06F 3/044; G06F 3/04812; G06F 3/033; G06F 3/04845;
(Continued)

(56) References Cited

U.S. PATENT DOCUMENTS 8,271,907 B2 * 9/2012 Kim .................... G06F 3/04883
345/173
9,075,507 B2 * 7/2015 Dempski ............... G06F 3/0482
(Continued)

FOREIGN PATENT DOCUMENTS

CN    102109926 A    6/2011
JP    11-065769       3/1999
(Continued)

OTHER PUBLICATIONS

"Z-touch: A multi-touch system for detecting spatial gestures near the tabletop", Reikmoto Lab, https://lab.rekimoto.org/projects/z-touch/, May 2016.
(Continued)

*Primary Examiner* — Andrew Sasinowski
(74) *Attorney, Agent, or Firm* — Kunzler Bean & Adamson

(57) ABSTRACT

An electronic device is disclosed. In one embodiment, the electronic device may include a display. The electronic device may include a proximity sensor that may generate one or more proximity coordinates of a pointing medium in a state of proximity to a surface of the display. The electronic device may include a touch sensor that may generate one or more contact coordinates of the pointing medium in a state of contact with the surface of the display. The electronic device may include a partial image control section that may generate and display on the display a partial image including an enlarged, predetermined area of an original image. The partial image control section may display the partial image in response to a flying flick operation of the pointing medium in the proximity state. The electronic device may include a contact coordinate processing section.

18 Claims, 10 Drawing Sheets

(51) Int. Cl.
*G06F 3/0484* (2013.01)
*G06F 3/0488* (2013.01)
*G06F 3/044* (2006.01)
*G06F 3/0481* (2013.01)

(52) U.S. Cl.
CPC ...... *G06F 3/04812* (2013.01); *G06F 3/04845* (2013.01); *G06F 3/04883* (2013.01); *G06F 2203/0381* (2013.01); *G06F 2203/04101* (2013.01); *G06F 2203/04106* (2013.01); *G06F 2203/04108* (2013.01); *G06F 2203/04806* (2013.01)

(58) Field of Classification Search
CPC ....... G06F 3/04883; G06F 2203/04806; G06F 2203/04101; G06F 2203/04106; G06F 2203/0381; G06F 2203/04108
See application file for complete search history.

(56) References Cited

U.S. PATENT DOCUMENTS

| | | | | |
|---|---|---|---|---|
| 9,129,045 | B2* | 9/2015 | Francis | ................ G06F 3/0485 |
| 2010/0333018 | A1 | 12/2010 | Numazaki | |
| 2011/0261078 | A1 | 10/2011 | Francis et al. | |
| 2013/0293490 | A1* | 11/2013 | Ward | .................... G06F 3/0488 |
| | | | | 345/173 |

FOREIGN PATENT DOCUMENTS

| | | |
|---|---|---|
| JP | 2007-072233 | 3/2007 |
| JP | 2010-271774 | 12/2010 |
| JP | 2011-134271 | 7/2011 |
| JP | 2012-043452 | 3/2012 |
| JP | 2013-175113 | 9/2013 |
| JP | 2013-196203 | 9/2013 |
| JP | 2013-225261 | 10/2013 |
| JP | 2014-035695 | 2/2014 |
| JP | 2014-115876 | 6/2014 |
| JP | 2015-510211 | 4/2015 |
| WO | 2011/027665 A1 | 3/2011 |
| WO | 2012/132802 A1 | 10/2012 |

OTHER PUBLICATIONS

Hiroyuki Washino et al., "3D Touch Panel User Interface", Information Technology R&D Center, Mitsubishi Electric Corporation, 2009.

* cited by examiner

USER INTERFACE FOR ELECTRONIC DEVICE, INPUT PROCESSING METHOD, AND ELECTRONIC DEVICE

FIELD

The subject matter disclosed herein relates to a technique for making easy input to a touch screen, and particularly to a technique for making easy input to a touch screen on which small operated objects are displayed.

BACKGROUND

An electronic device such as a smartphone or a tablet terminal allows a user to perform a touch operation with a finger or a stylus pen on an operated object displayed on a touch screen. The touch screen may be made up of a combination of a display and a touch sensor in order to perform a screen operation or enter characters. When the touch screen is small, the operated object also tends to be small and the user may touch an operated object adjacent to the target operated object.

Further, in an operating system (OS) like the Windows (registered trademark), which allows the user to use both a mouse operating mode for operations with a mouse pointer and a touch panel operating mode for touch operations on a touch screen, there is a case where small operated objects are contained on the premise of use of the mouse pointer. In this case, the touch operations are made more difficult. Various attempts have been made to solve this problem.

SUMMARY

An electronic device is disclosed. In one embodiment, the electronic device may include a display. The electronic device may include a proximity sensor that may generate one or more proximity coordinates of a pointing medium in response to the pointing medium being in a state of proximity to a surface of the display with an original image displayed on the display. The electronic device may include a touch sensor that may generate one or more contact coordinates of the pointing medium in response to the pointing medium being in a state of contact with the surface of the display. The electronic device may include a partial image control section that may generate and display on the display a partial image. The partial image may include an enlarged, predetermined area of the original image superimposed on the original image. The partial image control section may display the partial image in response to recognizing, from the proximity coordinates, a flying flick operation of the pointing medium in the proximity state. The electronic device may include a contact coordinate processing section that may output one or more contact coordinates of the partial image as contact coordinates of the original image to a user function.

In one embodiment, the electronic device may include a touch panel. The touch panel may include the proximity sensor and the touch sensor. The electronic device may include a touch screen that includes the display and the touch panel. In one embodiment, the one or more contact coordinates output by the contact coordinate processing section may correspond to a flick operation performed on the original image with the pointing medium in the contact state. In one embodiment, the electronic device may include a pointing device that may generate an event to control a mouse cursor displayed by the original image.

In one embodiment, the predetermined area of the original image may include start coordinates of the flying flick operation. In some embodiments, the partial image control section may generate data of a spot image to be displayed at coordinates just below the pointing medium in the proximity state. In one embodiment, the partial image control section may send an event to the user function. The event may include changing a display of an operated object of the original image in response to the pointing medium in the proximity state being positioned just above the operated object.

In some embodiments, the partial image control section may stop generating the partial image in response to a predetermined time elapsing since the pointing medium moved into a separation state after the display displayed the partial image. In one embodiment, the partial image control section may display an operated object displayed in the partial image corresponding to an operated object of the original image around the operated object displayed in the original image.

In one embodiment, the partial image control section may determine a position of the partial image relative to the original image based on a moving direction from start coordinates of the flying flick operation. In some embodiments, the partial image control section may determine a magnification of the partial image relative to the original image based on a moving direction from start coordinates of the flying flick operation. In one embodiment, the partial image control section may determine a magnification of the partial image relative to the original image based on a movement characteristic of the pointing medium performing the flying flick operation. The moving characteristic may include a moving speed or a moving acceleration.

In some embodiments, the partial image control section may determine a magnification of the partial image relative to the original image based on a flying flick operation repeatedly performed at a predetermined time interval or less. In one embodiment, the partial image control section sets at least one of a shape and a size of the partial image based on an arrangement of a plurality of operated objects of the original image.

The present disclosure discloses a method. The method may include detecting one or more proximity coordinates of a pointing medium that is in a state of proximity to a display with an original image displayed thereon. The method may include detecting a flying flick operation from the one or more proximity coordinates of the pointing medium in the proximity state. The method may include displaying a partial image that includes an enlarged predetermined area of the original image. Displaying the partial image may include superimposing the partial image on the original image in response to the detection of the flying flick operation. The method may include outputting one or more contact coordinates of the partial image as contact coordinates of the original image to a user function.

In one embodiment, the method may include detecting a contact flick operation performed on the display with the pointing medium. The pointing medium may be in a contact state of the display. In one embodiment, the method may include performing processing on the original image in response to the detection of the contact flick operation.

In one embodiment, the method may include performing a touch operation on an operated object of the original image without performing the flying flick operation and performing processing on the operated object without displaying the partial image. In one embodiment, the method may include extracting movement information from the flying flick operation and determining, based on the movement information, a size, a shape, coordinates, or a magnification of the partial image relative to the original image.

The present disclosure discloses a program product. The program product may include a non-transitory computer readable storage medium that stores code executable by a processor. The executable code may include code to display, on a display, an original image comprising an operated object. The executable code may include code to detect one or more proximity coordinates of a pointing medium moving in a direction of the XY axes at a speed of at least a predetermined value in a state of proximity to a surface of the display. The executable code may include code to display a partial image. The partial image may include an enlarged predetermined area of the original image superimposed on the original image in response to the detection of the proximity coordinates. The partial image may include the operated object. The executable code may include code to output one or more contact coordinates of the partial image as contact coordinates of the original image to a user function.

In one embodiment, the executable code may include code to detect a contact flick operation performed on the display with the pointing medium, the pointing medium being in a contact state of the display. The executable code may include code to and perform processing on the original image in response to the detection of the contact flick operation.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1A:
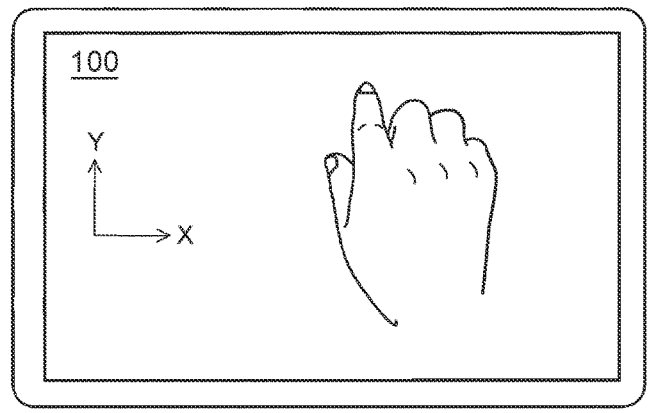
FIG. 1A is top-down view illustrating one embodiment of an electronic device.
Figure 1B:
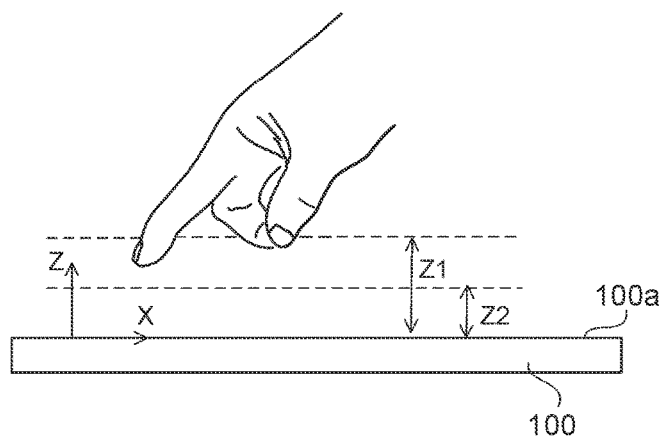
FIG. 1B is a side view illustrating another embodiment of an electronic device.
Figure 1C:
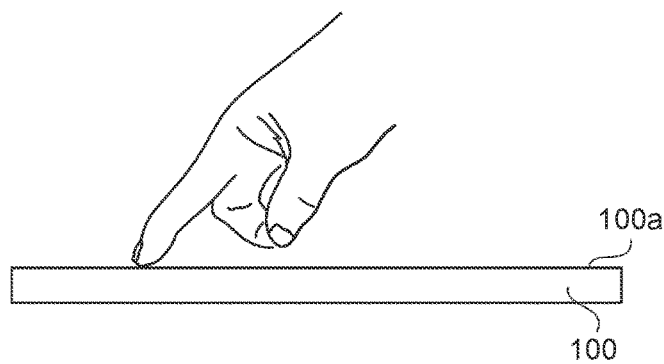
FIG. 1C is a side view illustrating another embodiment of an electronic device.

FIGS. 1A-1C depict several embodiments of an electronic device. The electronic device may include a display 100. The display 100 may include a touchscreen. FIGS. 1A and 1B depict one example of a state when a touch operation and a flying flick operation, explained below, are performed on the display 100. XY axes are defined on a surface 100a of the display 100, and a Z axis is defined in a direction perpendicular to the XY plane. As shown in FIG. 1B, a fingertip relative to the display 100 may be separated by distance Z1 in the Z-axis direction from the surface 100a of the touch screen. The fingertip and display 100 may be separated by a distance less than distance Z1 and more than distance Z2. The fingertip and the display 100 may be separated by a distance less than the distance Z2. FIG. 1C depicts a fingertip in a state where the fingertip is in contact with the touch screen when the distance Z is zero as illustrated in FIG. 1C.

In one embodiment, a user interface of the electronic device may accept input with a touch operation in a contact state. The contact state may include the finger being in contact with the surface 100a as illustrated in FIG. 1C. The flying flick operation may include the finger approaching the surface 100a at a certain distance from the surface 100a as illustrated in FIG. 1B. The finger approaching at the certain distance may include the finger being in a proximity state. The state where the fingertip is separated by a distance Z1 or more from the surface 100a may be called a "separation state." The state where the finger approaches the surface 100a from the separation state to a distance Z2 or less may be called the "proximity state." The proximity state may be maintained until the fingertip comes into a contact state or is separated by the distance Z1 or more.

Thus, in response to the position of the fingertip in the Z-axis direction being above 0 and less than the distance Z2, the state may correspond to the proximity state. In response to the fingertip being located between the distance Z1 and the distance Z2, the state may be either the proximity state or the separation state depending on how the fingertip reaches the position. In one embodiment, a conductive pointing medium, such as a stylus pen, may perform the touch operation and the flying flick operation. The flying flick operation may include a gesture for performing the same movement of the fingertip in the proximity state as that of the flick operation in the contact state (contact flick operation). However, since the flying flick operation may be performed in the air, there may be no guide surface on which the fingertip slides in the contact flick operation, which may cause slight movement of the fingertip in the Z-axis direction.

Although a variety of gestures are defined for touch operations performed in the contact state, in one embodiment, the movement of the finger in the XY direction, which is extracted from the flying flick operation, may be detected by the same algorithm as the contact flick operation. The touch operations may include input operations performed by bringing the finger or a stylus pen (hereinafter, both are simply called the fingertip) into contact with the surface 100*a* of the display 100. The touch operations may include an input operation to an operated object (such as an icon associated with a specific application or a specific file to be displayed on the display 100 or a character or an image object associated with a predetermined address) and an input operation to a display area other than the operated object.

A touch operation may include a tap operation without change in the position of a touch operation in a series of operations and gesture operations with a change in the position. A system that detects a tap operation may obtain information such as the coordinates of the touch operation, the amount of time for which the touch operation to the coordinates is continued, and the number of touch operations. A gesture operation may include a single-touch operation such as a flick operation, a swipe operation, a drag operation, and a rotating operation. A gesture operation may include multi-touch operations such as pinch-in and pinch-out. The system that detects a gesture operation may obtain information such as a coordinate trajectory of touch operations. The system may obtain the speed or acceleration of the coordinate change. The system may identify the type of gesture from the coordinate trajectory pattern, the direction of the change, or the like.

The contact flick operation may include an operation for moving a finger that performs a touch operation for a short distance in an approximately constant direction. The swipe operation may include a slide operation for moving the finger that performs a touch operation a distance longer than the flick operation in the approximately constant direction. The contact flick operation may include an operation whose traveling speed of the finger is faster than the swipe operation. The drag operation may include an operation for moving the finger to a certain position. The position may include the position of a specific object displayed on the display 100.

In some embodiments, the user may not know the coordinates of a destination of the fingertip for the contact flick operation. In one embodiment, the travel distance may be shorter and the traveling speed may be faster than the swipe operation and the drag operation. Therefore, the contact flick operation may be suitable for use in turning a page, scrolling a screen at high speed, moving the fingertip in a specified direction to confirm input like flick input on a keyboard, or the like. These operations may use the destination coordinates of the fingertip or pointing medium.

Although the fingertip may be in the state of proximity to the surface 100*a* in a flying flick operation, since the system may detect the flying flick operation by the same algorithm as the contact flick operation from the traveling speed and travel distance of the fingertip in the XY direction, in some embodiments, detecting a flying flock operation may be applicable to an existing system. To detect the flying flick operation, a proximity sensor may detect the coordinates of the fingertip in the proximity state.

Figure 2:
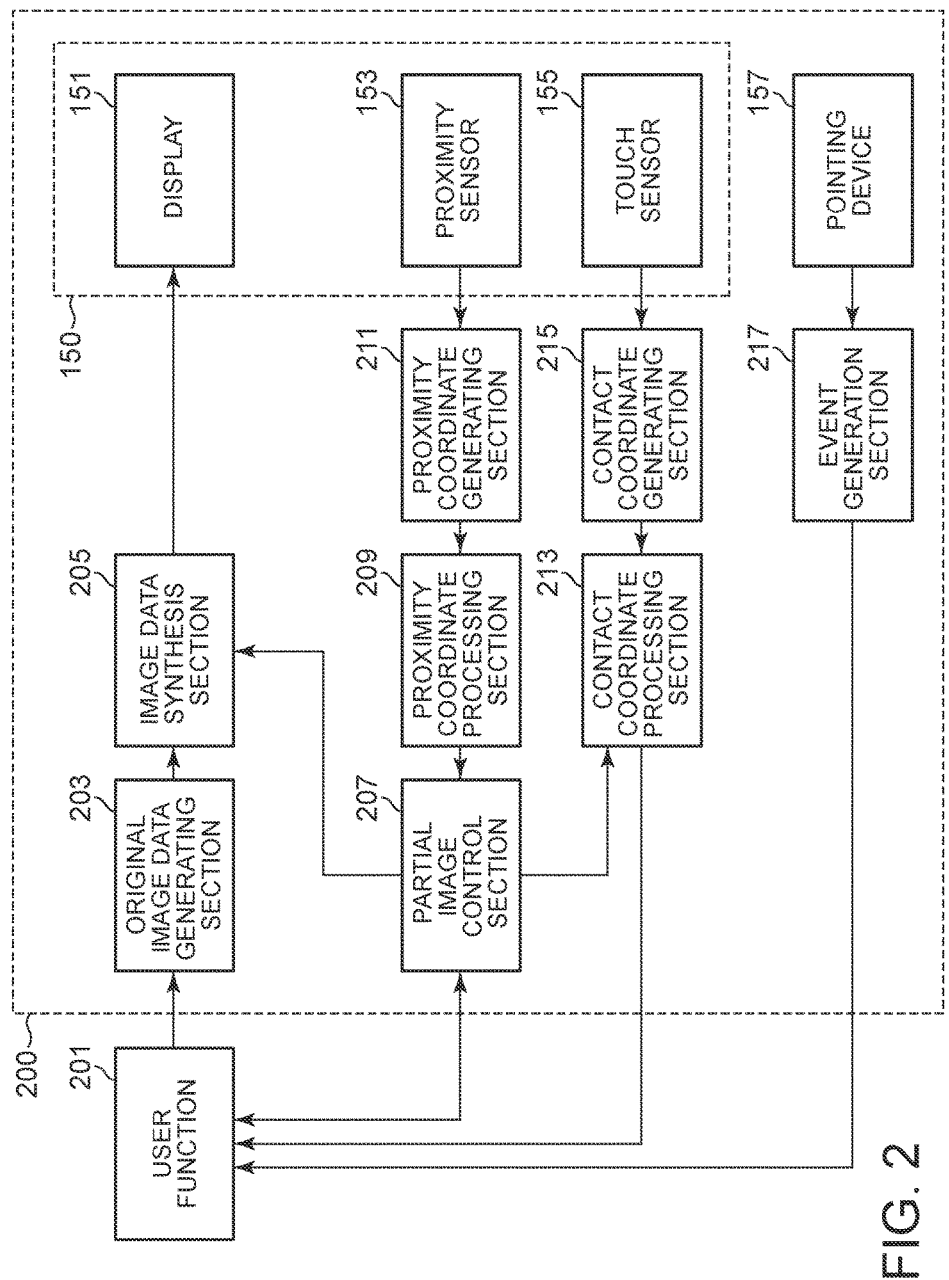
FIG. 2 is a schematic block diagram illustrating one embodiment of an electronic device.

FIG. 2 depicts one embodiment of an electronic device. The electronic device may include a user interface 200. The user interface 200 may include an input device. The input device may include a display 151, a proximity sensor 153, and/or a touch sensor 155. The input device may include hardware resources, such as a central processing unit (CPU), a random access memory (RAM), a computer-readable storage (including non-transitory computer reasonable storage) such as flash memory, a hard drive, or the like, and a chipset, in cooperation with software resources such as applications, an OS, and device drivers. The computer-readable storage may include executable code executable by a processor to carry out one or more processes or methods described herein.

In some embodiments, the user interface 200 may include a pointing device 157, such as a mouse, a pointing stick, or a touch pad, to control a mouse cursor. In other words, the user interface 200 may support both the mouse operating mode and the touch panel operating mode. Prior to execution, the software resources may be stored in a nonvolatile memory mounted in the user interface 200 or an electronic device with the user interface 200, such as a computer, a tablet terminal or a smartphone.

In one embodiment, the electronic device may include the proximity sensor 153. The proximity sensor 153 may generate one or more proximity coordinates of a pointing medium. The proximity sensor 153 may generate the one or more proximity coordinates in response to the pointing medium being in a state of proximity to a surface of the display 151 with an original image (for example, the original image 303 of FIG. 5A, explained below) displayed on the display 151. In one embodiment, the display 151 may display an original image. The original image may include one or more objects, pictures, or the like displayed on the display 151. The original image may include an interactable user interface displayed on the display.

The proximity sensor 153 may output a physical value capable of generating the XYZ coordinates of a fingertip in the proximity state with respect to the display 151. In one embodiment, the proximity sensor 153 may include an electromagnetic induction sensor, an optical line sensor using infrared light, a stereo camera, an ultrasonic sensor, or the like. The proximity sensor 153 may be provided as an assembly different from that of the display 151. As described above, a pointing medium may include a fingertip, a stylus pen, or the like.

In one embodiment, the electronic device may include a touch sensor 155. The touch sensor 155 may generate one or more contact coordinates of the pointing medium. The touch sensor 155 may generate the one or more contact coordinates in response to the pointing medium being in a state of contact with the surface of the display 151. The touch sensor 155 may output a physical value capable of generating the XY coordinates of a pointing medium in the state of contact with the surface of the display 151. The touch sensor 155 may include a capacitive touch panel. The capacitive touch panel may detect, as the magnitude of the capacitance, the distance Z of the pointing medium in the proximity state from the touch panel surface. In one embodiment, the capacitive touch panel may include one or more transparent electrodes that function as the proximity sensor 153, the touch sensor 155, and a touch screen 150 set up on the display 151. In one embodiment, the touch panel may include the proximity sensor 153 and the touch sensor 155. In some embodiments, the electronic device may include the touch screen 150. The touch screen 150 may include the display 151 and the touch panel.

In some embodiments, the electronic device may include a partial image control section 207. The partial image control section 207 may generate and display on the display 151 a partial image (for example, the partial image 313 of FIG. 5A, explained below). The partial image may include an enlarged, predetermined area of the original image displayed on the display. The partial image control section 207 or the display 151 may superimpose the partial image on the original image in response to recognizing, from proximity coordinates, a flyting flick operation of the pointing medium in the proximity state.

In one embodiment, a proximity coordinate generating section 211, a contact coordinate processing section 215, and an event generation section 217 may be configured by device drivers and a device controller. The proximity coordinate generating section 211 may generate the XYZ coordinates of a fingertip in the proximity state from a physical value output by the touch screen 150. In the proximity state, distance between the surface of the touch screen 150 and the pointing medium may include various values. In response to detecting the proximity state from a Z-axis distance of the fingertip and history information leading to the distance, the proximity coordinate generating section 211 may output, as proximity coordinates, coordinates corresponding to a physical value identifiable as the proximity state to the proximity coordinate processing section 209.

In some embodiments, the contact coordinate generating section 215 may generate the XY coordinates of a fingertip in the contact state (contact coordinates) from a physical value output by the touch screen 150. In response to detecting the contact state from a Z-axis distance of the fingertip or a physical value output by the touch screen 150, the contact coordinate generating section 215 may output the contact coordinates. In some embodiments, in response to the proximity coordinate system and the contact coordinate system being different, both may be associated with each other to process a touch operation to a partial image to be described later as a touch operation to an original image. However, in one embodiment, both coincide to generate the two coordinate systems on the touch screen 150. The pointing device 157 may output a physical value for moving a mouse cursor according to a user's operation. The pointing device 157 may generate an event to control a mouse cursor displayed on the original images 303. In one embodiment, the pointing device 157 may cause the event generation section 217 to generate the event. The event generation section 217 may output an event corresponding to an event for moving the mouse cursor or a mouse click.

In one embodiment, the fingertip in the proximity state may impose a change in capacitance in a range of cells wider than that in the contact state. The proximity coordinate processing section 209 may output, as proximity coordinates, a range of cells wider than that when the contact coordinate processing section 215 generates contact coordinates. The XY coordinates on the touch screen 150, formed by a perpendicular line from the pad of a fingertip to the touch screen 105, may be called "just-below coordinates." In one embodiment, the proximity coordinate processing section 209 may generate the just-below coordinates from a set of proximity coordinates. The proximity coordinate processing section 209 may notify the partial image control section 207 of the generated coordinates. As one example, the just-below coordinates may be set as the center of gravity of the set of proximity coordinates.

In some embodiments, the electronic device may include a contact coordinate processing section 213. The contact coordinate processing section 213 may output one or more contact coordinates of the partial image as contact coordinates of the original image to a user function 201. In one embodiment, a pointing medium contacting a certain location on the display 151 may include generating one or more contact coordinates of that location. The location may include a location containing the partial image. In response to contacting the partial image, the contact coordinate processing section 213 may output those contact coordinates as contact coordinates of the original image to a user function 201. The user function 201 may operate on the original image as though the pointing medium had contacted the original image instead of the partial image.

In one embodiment, the one or more contact coordinates output by the contact coordinate processing section 213 may correspond to a flick operation performed on the original image with the pointing medium in the contact state. The contact coordinate processing section 213 may generate coordinates of a pointing medium from a set of contact coordinates and may send the generated coordinates to the user function 201. The contact coordinate processing section 213 may detect contact coordinates in response to a touch operation that sets the contact coordinates as start coordinates. In some embodiments, the contact coordinate processing section 213 may send the user function 201 operation data. The data may include information on moving direction or moving speed or acceleration. The touch operation may include a contact flick operation. In one embodiment, the contact flick operation may include direct input to the user function 201, while a flying flick operation may include input only related to a flick window (such as the flick window 325 of FIG. 7A, explained below). Thus, since the flying flick operation may provide a display by superimposing a partial image on an original image, the flying flick operation may not affect the operating system (OS or an existing application of the electronic device.

In one embodiment, the user function 201 may include one or more applications, an OS, or the like. The applications, OS, or the like may provide browsing in a browser, photo editing, document creation, other software interaction, or the like to a user through the touch screen 150. The user function 201 may send image information to an original image data generating section 203 and the partial image control section 207. In one embodiment, the original and partial image control sections 203, 207 may use the image information to generate data on an original image. The original image data generating section 203 may include a buffer for storing image data. The original image data generation section 203 may render the image information to generate image data from the image information received from the user function 201 in order to provide a display on the touch screen 150.

In some embodiments, the partial image control section 207 may generate data on the partial image 313 from the image information received from the user function 201. The partial image control section 207 may monitor a time change in the just-below coordinates to recognize a flying flick operation. The partial image control section 207 may extract just-below coordinates (start coordinates) from the flying flick operation, as a position where the flying flick operation is started, and moving information such as the moving direction, the moving speed, or acceleration, and the like. In one embodiment, the predetermined area of the original images 303 may include the start coordinates of the flying flick operation.

In one embodiment, the partial image control section 207 may generate data of the partial image to be displayed in a flick window. The partial image control section 207 may generate the data of the partial image from the image information received from the user function 201, the start coordinates extracted from the flying flick operation, or the moving information, and may output the data to an image data synthesis section 205. In some embodiments, the partial image control section 207 may generate and send data of a spot image to the image data synthesis section 205. The spot image may be displayed at the just-below coordinates in the proximity state and the flying flick operation. The spot image may allow the user to recognize an operated object overlapped with the just-below coordinates in the proximity state or to perform a tap operation without displaying the flick window. The just-below coordinates may include coordinates just below the pointing medium in the proximity state.

In one embodiment, the partial image control section 207 may send an event to the user function 201. The event may include changing a display of an operated object of the original image 303 in response to the pointing medium in the proximity state being positioned just above the operated object. For example, the just-below coordinates may overlap an operated object, such as a button, a character or a graphic contained in an original image 303 displayed on the touch screen 150. The partial image control section 207 may send an event for highlighting the operated object to the user function 201. Since the user can recognize the highlighted operated object, it may be beneficial to prevent an erroneous operation when a touch operation is performed directly without a flying flick operation.

In certain embodiments, the partial image control section 207 may determine the size, shape, and coordinates of the flick window, or the like based on the start coordinates included in the flying flick operation or the moving information. The partial image control section 207 may determine a magnification for enlarging or reducing the partial image relative to the original image based on the start coordinates included in the flying flick operation or the moving information. The partial image control section 207 may send the coordinates of the partial image to the contact coordinate processing section 213. The contact coordinate processing section 213 may transform the coordinates of the touch operation to the partial image into the coordinates of the touch operation to the original image 303. The contact coordinate processing section 213 may send the coordinates to the user function 201.

In one embodiment, the partial image control section 207 may stop generating the partial image in response to a predetermined time elapsing since the pointing medium moved into a separation state after the display 151 displayed the partial image. For example, the predetermined time may be five seconds. The pointing medium may be in a proximity state with the partial image displayed on the display 151. The user may move the pointing medium away from the display such that the pointing medium is in a separation state with the display 151. In response to the pointing medium moving into a separation state, the electronic device, the partial control section 207, or the like may initiate a timer. In response to the timer exceeding the predetermined time (in this example, five seconds), the partial image control section 207 may stop displaying the partial image on the display 151. In response to the pointing medium moving back into the proximity state before the timer exceeds the predetermined time (for example, the pointing medium may move back into the proximity state three seconds after moving into the separation state), the timer may deactivate and the partial image control section may continue to display the partial image.

In one embodiment, the partial image control section 207 may display an operated object displayed in the partial image. The operated object may correspond to an operated object of the original image. The partial image control section 207 may display the operated object of the partial image around the operated object of the original image. For example, the original image may include an icon. A pointing medium contacting the icon may open a software application on the electronic device. The operated object may include the icon. The partial image control section 207 may generate a partial image and the partial image may include the icon. The partial image control section 207 may generate the partial image near the icon on the original image. For example, the partial image control section 207 may generate the partial image above, below, or to the side of the icon of the original image. The partial image being located near the icon may assist the user in recognizing that the icon of the partial image corresponds with the icon of the original image.

In one embodiment, the partial image control section 207 may recognize the direction of the flying flick operation. The direction of the flying flick operation may be set to the direction of XY coordinates with the start coordinates as the starting point. The partial image control section 207 may predefine, for the direction of the flying flick operation, about four directions or eight directions with the start coordinates as the starting point to associate, with respective directions, the display methods of the flick window and the partial image, and the like. The partial image control section 207 may determine a position of the partial image relative to the original image based on the moving direction from the start coordinates of the flying flick operation.

For example, the partial image control section 207 may recognize that the start coordinates of the flying flick operation and that the direction of the operation is to the left. In response to the moving direction being to the left, the partial image control section 207 may generate the partial image to the left of the start coordinates.

In one embodiment, the partial image control section 207 may determine a magnification of the partial image relative to the original image based on a moving direction from the start coordinates of the flying flick operation. For example, the partial image control section 207 may recognize that the start coordinates of the flying flick operation and that the direction of the operation is to the left. The partial image control section 207 may generate the partial image and may increase the magnification in response to the flying flick operation moving away from the start coordinate. The partial image control section may decrease the magnification in response to the flying flick operation moving toward the start coordinate.

In one embodiment, the partial image control section 207 may determine a magnification of the partial image relative to the original image based on a movement characteristic of the pointing medium performing the flying flick operation. The movement characteristic may include moving speed or moving acceleration of the flying flick operation. For example, the partial image control section 207 may recognize the flying flick operation and generate the partial image. The partial image control section 207 may determine a moving speed or acceleration over a first distance of the display 151 and over a second distance of the display 151. The partial image control section 207 may determine that the moving speed or acceleration over the second distance was greater than the moving speed or acceleration over the first distance. In response, the partial image control section 207 may increase the magnification of the partial image more while the flying flick operation travels over the second distance than the first distance.

In some embodiments, the partial image control section 207 may determine a magnification of the partial image relative to the original image based on a flying flick operation performed repeatedly at a predetermined interval or shorter. For example, in one embodiment, the predetermined interval may be one second. The partial image control section 207 may recognize a first flying flick operation. In response to recognizing the first flying flick operation, the partial control section 207 may generate the partial image. The partial image control section 207 may recognize a second flying flick operation and may determine that the flying flick operation occurred less than that predetermine interval (in this case, one second) from the first flying flick operation. In response, the partial image control section may increase the magnification of the partial image. The partial image control section may then recognize a third flying flick operation and may determine that the third flying flick operation occurred more than the predetermined interval from the second flying flick operation. In response, the partial image control section 207 may not increase the magnification of the partial image.

Figure 7A:
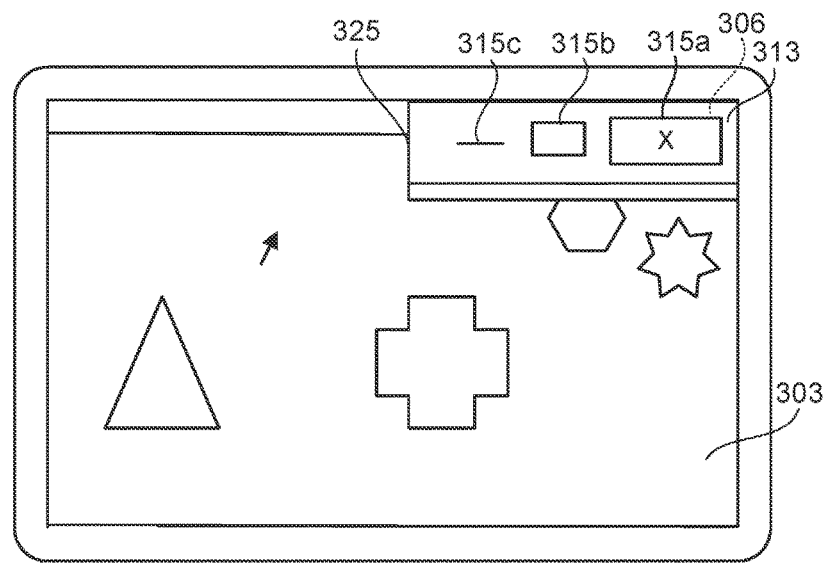
FIG. 7A is a top-down view illustrating one embodiment of an electronic device.
Figure 7B:
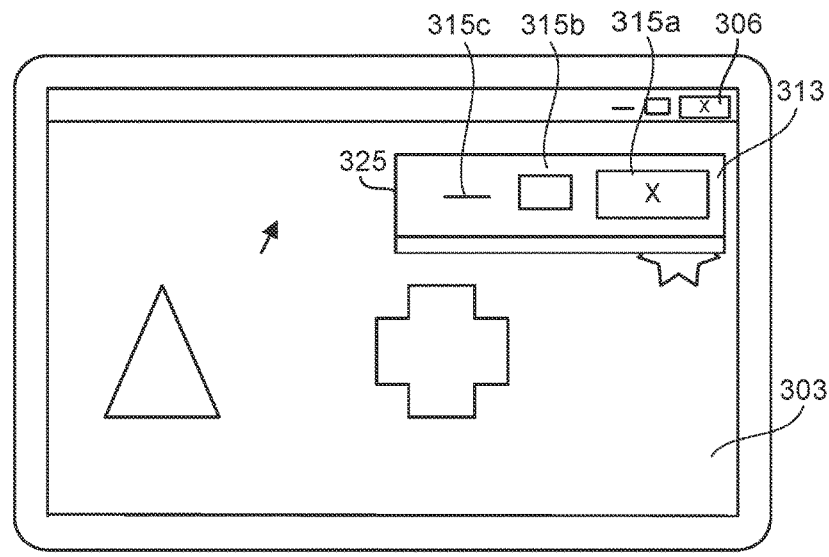
FIG. 7B is a top-down view illustrating another embodiment of an electronic device.

In one embodiment, the partial image control section 207 may set a shape or a size of the partial image control section based on an arrangement of multiple operated objects of the original image. For example, the shape of the partial image may include a vertically long rectangle, a horizontally long rectangle, or a round shape. The partial image control section 207 may determine the shape of the partial image 313 from the arrangement of operated objects around the start coordinates of the flying flick operation. For example, as illustrated in FIG. 5A, when the operated objects 301a, 301b, and 301c are arranged side by side in the X-axis direction of the original image 303, the image data generating section 207 may set the partial image 313 horizontally long in the X-axis direction as illustrated in FIGS. 7A and 7B.

Figure 3:
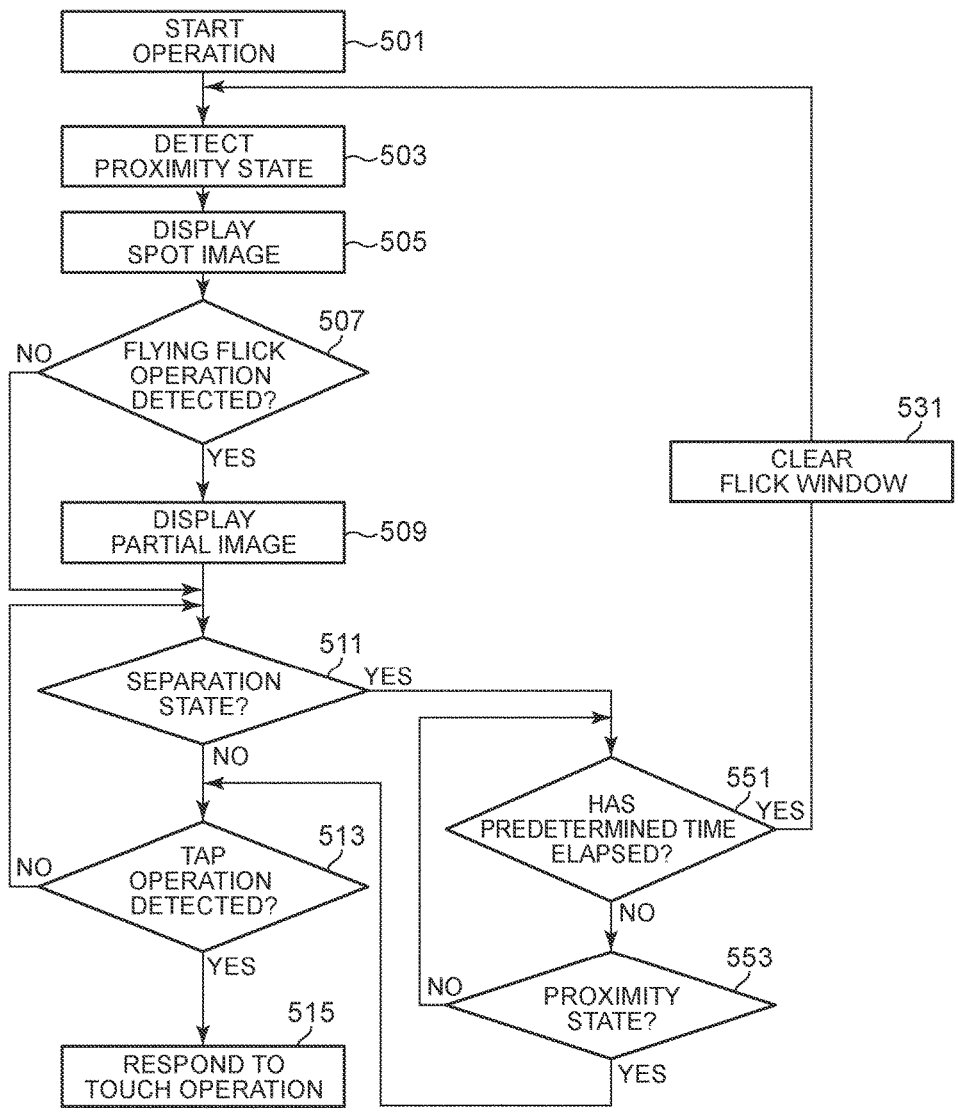
FIG. 3 is a schematic block diagram illustrating one embodiment of a method for a procedure when a user interface displays a flick window.
Figure 4:
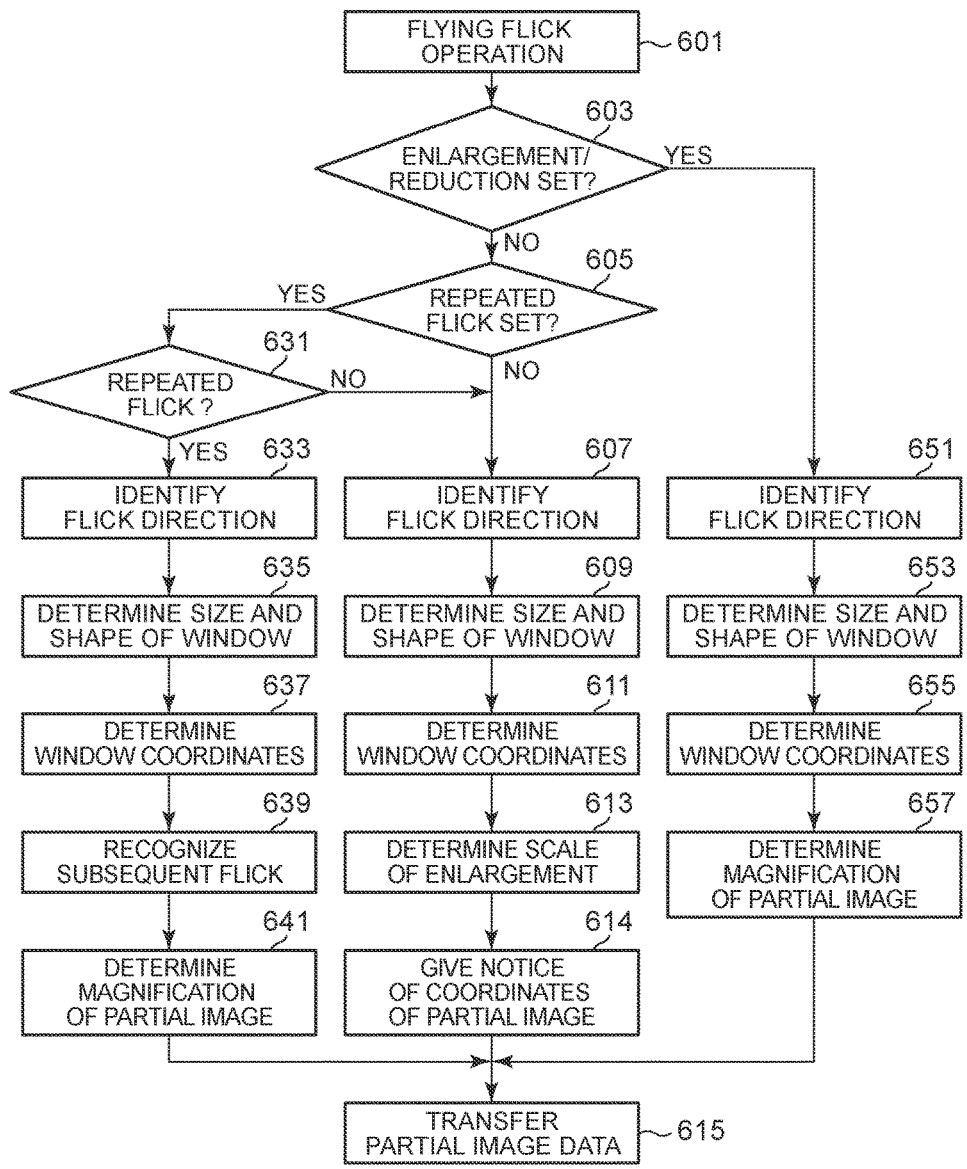
FIG. 4 is a schematic block diagram illustrating one embodiment of a method for a procedure for displaying a partial image.

FIG. 3 depicts one embodiment of a method for a procedure when the user interface 200 displays a flick window. FIG. 4 depicts one embodiment of a method for a procedure for displaying the flick window. FIGS. 5 through 11 depict various embodiments of an electronic device.

Figure 5A:
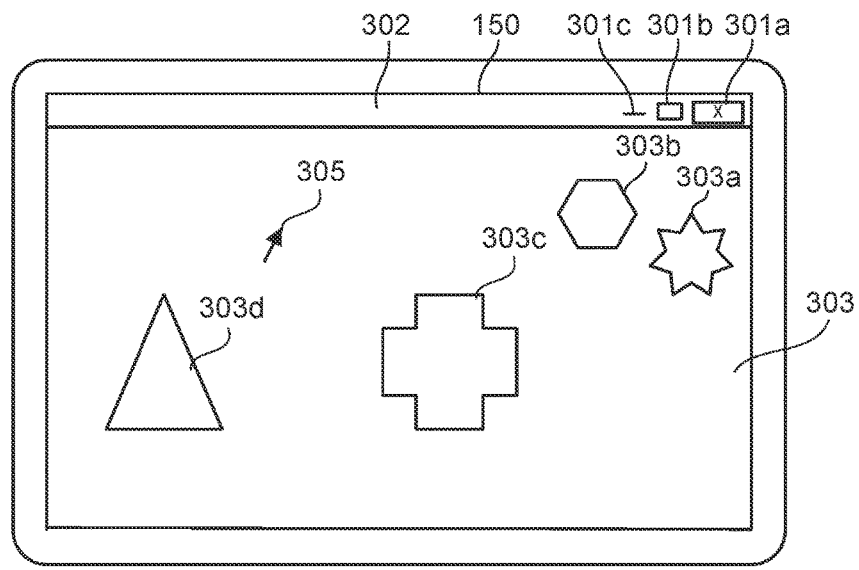
FIG. 5A is an top-down view illustrating one embodiment of an electronic device.

As illustrated in FIG. 5A, in one embodiment, before the start of the operation in block 501, an original image 303 may be displayed. The original image 303 may include one or more objects, such as objects 303a to 303d. The original image may be displayed in a window containing a title bar 302 on the touch screen 150. An electronic device may include a display (such as the display 151 described above). The display may include the touch screen 150. On the touch screen 150, a mouse cursor 305 controlled by the pointing device 157 may also be displayed. Although the user interface 200 may operate in both the mouse operating mode and the touch panel operating mode for the original image 303, the present disclosure may also be applied to a user interface supporting only the touch panel operating mode.

In some embodiments, an original image operated in the mouse operating mode may tend to have operated objects smaller than those of an original image operated in the touch panel operating mode. The present disclosure can be applied to original images in both multi-window and single-window systems. The title bar 302 may include operation buttons 301a to 301c as examples of operated objects. A user may tap the operation button 301a to close the window, tap the operation button 301b to reduce or restore the window size, or tap the operation button 301c to minimize the window.

Figure 5B:
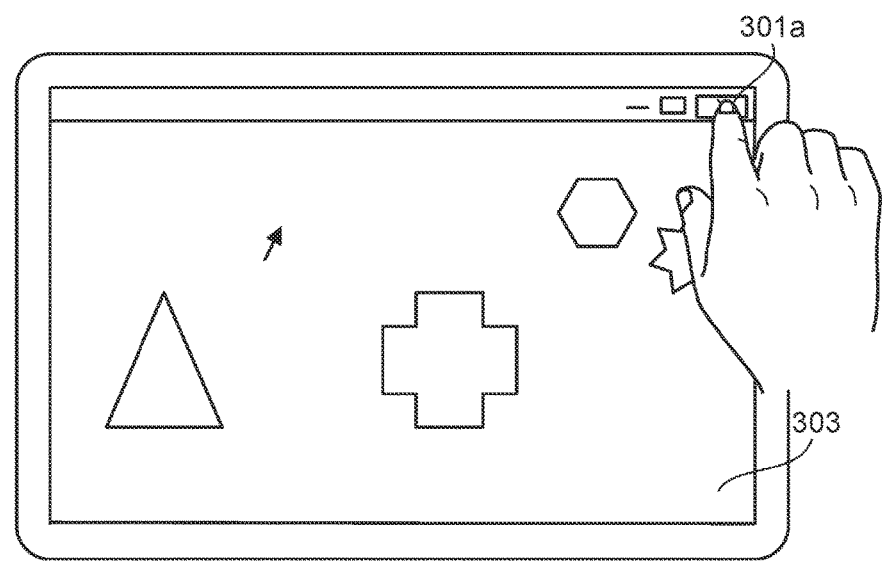
FIG. 5B is a top-down view illustrating another embodiment of an electronic device.

In some embodiments, the mouse cursor 305 may move to each of these operated objects to activate the object with a click operation or the user may tap with a fingertip to execute a function defined by the operated object. In block 503, the method may include detecting a proximity state. Detecting a proximity state may include detecting one or more proximity coordinates of a pointing medium that is in a state of proximity to a display with an original image displayed on the display. In one embodiment, the user may try to tap the button 301a as illustrated in FIG. 5B to close the window of the original image 303. Since the size of the button 301a may not be not large enough compared with the size of the fingertip, the user may tap the adjacent button 301b when tapping the button 301a.

Figure 6A:
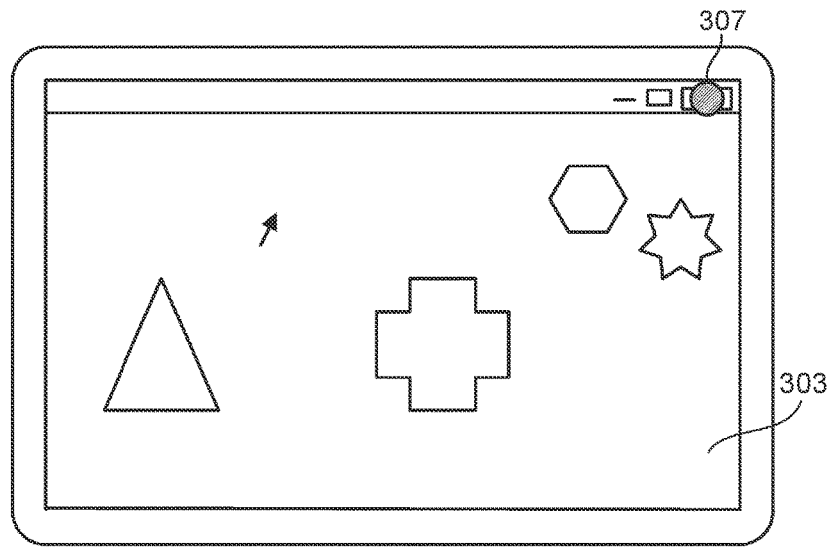
FIG. 6A is a top-down view illustrating one embodiment of an electronic device.

As illustrated in FIG. 6A, in one embodiment, the user may move his or her fingertip around directly above the button 301a. In response to detecting the proximity, the proximity coordinate generating section 211 may start outputting a set of proximity coordinates. The proximity coordinate processing section 209 may output just-below coordinates. In block 505, the partial image control section 207 may display a spot image 307 at the just-below coordinates. Although the spot image 307 may appear overlapped with the original image 303, the spot image 307 may be displayed at the just-below coordinates without affecting the operation of the user function 201. From the spot image 307, the user may recognize the start coordinates of the flying flick operation making it possible to perform a touch operation on a relatively large operated object overlapped with the spot image 307 even with a parallax without displaying the flick window 325.

In one example, in response to an operated object being located at the just-below coordinates, the partial image control section 207 may instruct the user function 201 to highlight the operated object. The highlighted operated object may become part of the original image 303. The operated object becoming part of the original image 303 may enable the user to perform a touch operation on the highlighted operated object without displaying the flick window 325.

In one embodiment, prior to the tap operation in a state where the fingertip enters the proximity state, the user may think of whether to really close the window. In some cases, the user may delay and think about whether to reduce or minimize the window. However, even in response to the fingertip entering the proximity state, since the partial image control section 207 may not display the flick window 325 unless a flying flick operation is detected, the user may not feel annoyed by the flick window 325 displayed when there may be no need for the user.

Figure 6B:
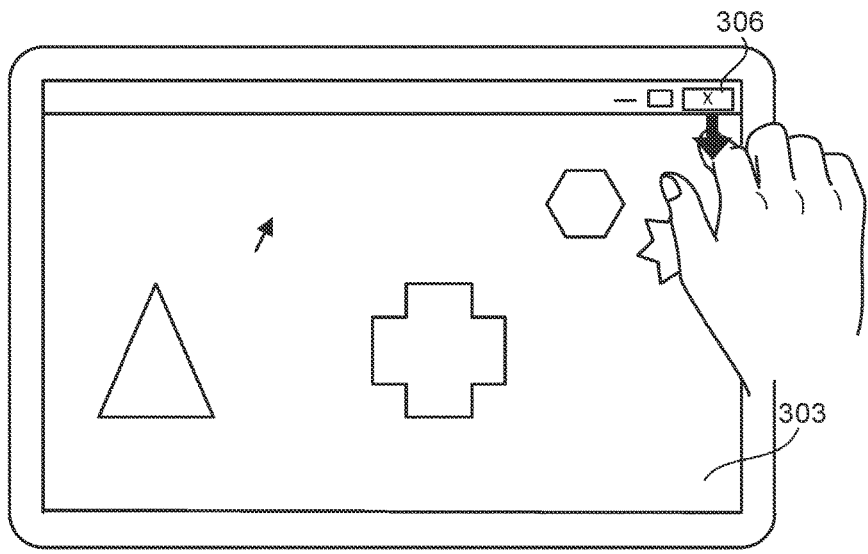
FIG. 6B is a top-down view illustrating another embodiment of an electronic device.

In block 507, the method may include detecting a flying flick operation. Detecting the flying flick operation may include detecting the flying flick operation from one or more proximity coordinates of the pointing medium in the proximity state. In one embodiment, the user may perform a flying flick operation using the operated object 301a as the start coordinates 306 as illustrated in FIG. 6B. In one embodiment, the partial image control section 207 may display the flick window 325 and the partial image even if the start coordinates of the flying flick operation do not overlap any of operated objects. The user may not need to set an operated object intended to operate as the start coordinates to display the flick window. The user may perform the flying flick operation by moving the anterior part of the second joint of an index finger to move the fingertip quickly. The partial image control section 207 may generate and send the partial image 313 to the image data synthesis section 205.

As illustrated by FIG. 7A, in one embodiment, in block 509, the method may include displaying a partial image 313. The partial image 313 may include an enlarged, predetermined area of the original image 303. Displaying the partial image 313 may include superimposing the partial image 313 on the original image 303 in response to detecting the flying flick operation. In one embodiment, the image data synthesis section 205 may set the flick window 325 to overlap with the original image 303 and display the partial image 313. The partial image 313 may include operated objects 315a, 315b, and 315c corresponding to the operated objects 301a, 301b, and 301c. At this point, there may be no touch operation performed on the original image 303. In block 511, the proximity coordinate generating section 211 may continuously monitor the proximity state and stop outputting the proximity coordinates in response to the proximity state shifting to the separation state. In response to maintaining the proximity state, the procedure may proceed to block 513. In response to the proximity state shifting to the separation state, the procedure may proceed to block 551. In block 513, the user may perform a tap operation on the operated object 315a contained in the partial image 313.

In one embodiment, in response to the partial image 313 being made larger than the image in the original image 303, the user may accurately perform a tap operation on the operated object 315a with the fingertip. As illustrated by FIG. 7B, in response to the flying flick operation completing, the index finger may not be on the operated object 315a and the user may clearly see the operated object 315a in the partial image 313 displayed around the start coordinates 306. In one embodiment, in response to the partial image 313 being in a position away from the start coordinates 306, as depicted in FIG. 7B, the user may perform the tap operation while viewing both the original image 303 and the partial image 313. In either method, the partial image 313 may be displayed in a position convenient for the user.

In block 513, in response to the user performing the tap operation on the operated object 315a, the contact coordinate processing section 213 may transform the coordinates and send the user function 201 the coordinates of the corresponding operated object 301a contained in the original image 325. In block 515, the user function 201 may process a touch operation on the operated object 301a of the original image 303. In one embodiment, processing the touch operation 515 may include processing the touch operation on the partial image 313 as a touch operation on the original image 303. In one embodiment, processing the touch operation 515 may include outputting one or more contact coordinates of the partial image 313 as contact coordinates of the original image 303 to a user function 201. The user function 201 may not need to recognize the coordinates of the partial image 313 to process the tap operation on the partial image 313. Therefore, the user function 201 may not need to change operation involved in displaying the partial image 313 in the flick window 325.

In some embodiments, the user may perform a contact flick operation separately from the flying flick operation. In response to receiving coordinate data corresponding to a contact flick operation from the contact coordinate processing section 213, the user function 201 may perform processing corresponding to scrolling the screen, turning a page, flick input to a software keyboard, or the like. When displaying the partial image 313 as a result of a contact flick operation, these functions may not be used. However, in some embodiments, since the partial image 313 may be displayed on a layer different from the contact flick operation, these functions may not be affected.

In block 551, the partial image control section 207 may determine, from the time of stopping the input of the just-below coordinates, whether a predetermined time has elapsed since the fingertip moved into the separation state. In response to the predetermined time elapsing, the partial image control section 207 may recognize the end of the proximity state in block 531, may clear the setting of the flick window 325, and may stop outputting data on the partial image 313. In some embodiments, the image data synthesis section 205 may clear the display of the partial image 313.

In one embodiment, in response to the user cancelling the tap operation to the partial image 313 even if the partial image 313 is displayed, the user may move the fingertip into the separation state to clear the partial image 313. In block 553, in response to the fingertip moving into the proximity state again within a given length of time, the procedure may proceed to block 513 to enable a tap operation. Thus, since the flying flick operation may complete even if the fingertip temporarily moves into the separation state during a period from the start coordinates to the end of the flying flick operation, a strict gesture may not be required from the user.

FIG. 4 depicts one embodiment of a method to display a partial image. The method of FIG. 4 may be an example of the procedure in block 509 of FIG. 5. The partial image control section 207 that recognizes a flying flick operation in block 601 may determine in block 603 whether enlargement/reduction is set. In response to setting an enlargement/reduction in the partial image control section 207, the procedure may proceed to block 651. In response to not setting enlargement/reduction, the procedure may proceed to block 605. In block 605, the partial image control section 207 may determine whether a repeated flying flick operation is set.

In one embodiment, the repeated flying flick operation may mean that multiple flying flick operations are continuously performed at predetermined time intervals or shorter. Since the second and subsequent flying flick operations may include a coherent operation integrated with the first flying flick operation in terms of time, the start coordinates of the second and subsequent flying flick operations may not be matched to the start coordinates of the first flying flick operation. In some embodiments, the start coordinates of the repeated flying flick operation are set to the start coordinates of the first flying flick operation. In response to the partial image control section 207 setting the repeated flying flick operation, the procedure may proceed to block 631. In response to the partial image control section 207 not setting the repeated flying flick operation, the procedure may proceed to block 607.

In certain embodiments, in block 607, the partial image control section 207 may recognize the direction of the flying flick operation. The direction of the flying flick operation may be set to the direction of XY coordinates with the start coordinates as the starting point. The partial image control section 207 may predefine, for the direction of the flying flick operation, about four directions or eight directions with the start coordinates 306 as the starting point. The partial image control section 207 may associate, with respective directions, the display methods of the flick window 325 and the partial image 313, or the like.

In block 609, in one embodiment, the partial image control section 207 may determine the size and shape of the flick window 325 from moving information on the flying flick operation. The size of the flick window 253 may be determined by default or based on the speed or acceleration of the flying flick operation. For example, the partial image control section 207 may set the size larger as the moving speed of the fingertip is faster.

In one embodiment, the user may adjust the size of the flick window 325 by controlling the moving speed of the fingertip performing the flying flick operation in the XY direction. Although the fingertip movement may include a Z-axis component, in some embodiments, the partial image control section 207 may extract only the components in the XY direction. The user may more easily control the moving speed of the fingertip in the XY direction compared to controlling movement in the Z-axis direction. In one embodiment, the partial image control section 207 may extract the components in the X direction, the Y direction, the Z direction, the XY direction, YZ direction, the XZ direction, or the XYZ direction.

The shape of the flick window 325 may include a vertically long rectangle, a horizontally long rectangle, or a round shape. In some embodiments, the partial image control section 207 may determine the shape of the flick window 325 from the arrangement of operated objects around the start coordinates 306. For example, as illustrated in FIG. 5A, in response to the operated objects 301a, 301b, and 301c being arranged side by side in the X-axis direction of the original image 303, the image data generating section 207 may set a flick window 325 horizontally long in the X-axis direction as illustrated in FIGS. 7A and 7B. The operated objects 301a-c may be arranged side by side in the X-axis direction or the Y-axis direction.

Figure 10:
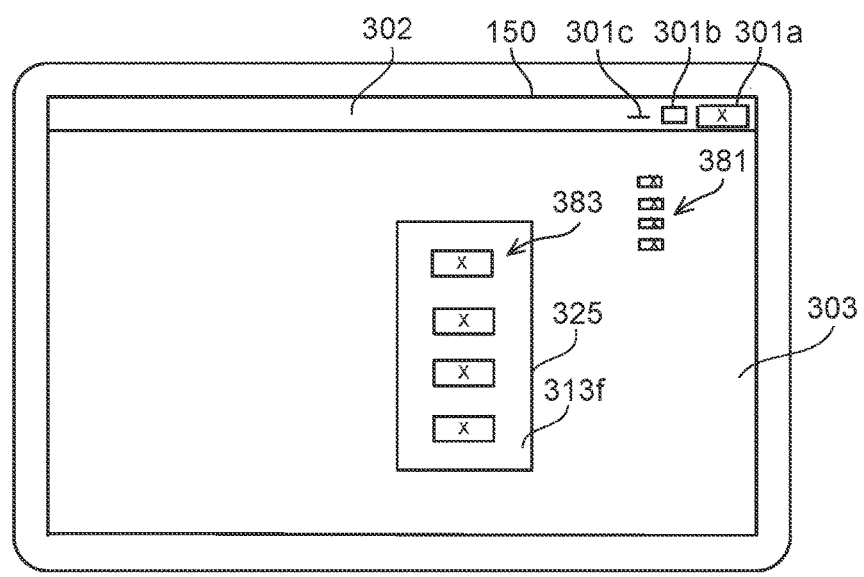
FIG. 10 is a top-down view illustrating one embodiment of an electronic device.

In one embodiment, as illustrated in FIG. 10, if operated objects 381 of the original image 303 are arranged in the Y-axis direction, the partial image control section 207 may set a flick window 325 vertically long in the Y-axis direction to display operated objects 383 corresponding to the operated objects 381 as part of a partial image 313f. Further, in response to the start coordinates 206 not including an operated object in proximity, the partial image control section 207 may set a directionless flick window, such as a round shape or a square shape.

In block 611, in some embodiments, the partial image control section 207 may determine the coordinates of the flick window 325. The partial image control section 207 may determine the coordinates of the flick window 325 such that the center of gravity of the flick window 325 coincide with the start coordinates 306. In such a case, as depicted in FIG. 7A, if part of the flick window 325 sticks out of the screen, the partial image control section 207 may determine the coordinates of the flick window 325. The coordinates may include a position that the operated object 315a of the flick window 325. The operated object 301a of the original image 303 will be closest to each other. The entire area of the flick window 325 may be contained within the screen.

In one example, as illustrated by FIG. 7B, the partial image control section may determine the coordinates of the flick window 325 in a position where the flick window 325 is separated by a predetermined distance from the start coordinates 306 in the direction of the flying flick operation. In one embodiment, the partial image control section 207 may determine the distance from the start coordinates based on the speed or acceleration of the flying flick operation. For example, the partial image control section 207 may set the distance longer as the speed or acceleration is faster. In this case, the user may determine the position of the flick window 325 by controlling the moving speed of the fingertip in the XY direction with which the flying flick operation is performed.

In block 613, the partial image control section 207 may determine the scale of enlargement of the partial image 313 to be displayed in the flick window 325. In one embodiment, the partial image control section 207 may determine the scale of enlargement by default or based on moving information on the flying flick operation. For example, the partial image control section 207 may set the scale of enlargement larger as the moving speed of the fingertip is faster. The user may adjust the scale of enlargement of the partial image 313 by controlling the moving speed of the fingertip with which the flying flick operation is performed.

In some embodiments, in block 614, the partial image control section 207 may notify the contact coordinate processing section 213 of the coordinates of the partial image 313 in a range of the flick window 325. In response to receiving the notification, the contact coordinate processing section 213 may transform contact coordinates detected from a touch operation to the partial image 313 into the coordinates of the original image 303 and may transfer the coordinates to the user function 201. In block 615, the partial image control section 207 may generate data on the partial image 313 to be displayed in the flick window 325 determined in terms of size, shape, or coordinates. The partial image control section 207 may transfer the data to the image data synthesis section 205. In block 509 of FIG. 3, the partial image data synthesis section 205 may display the partial image 313 in a position of the flick window 325.

Figure 8A:
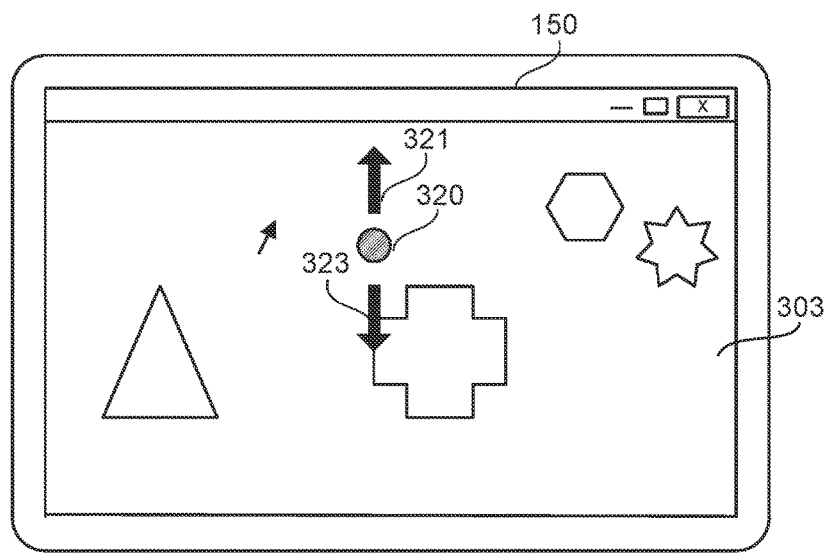
FIG. 8A is a top-down view illustrating one embodiment of an electronic device.
Figure 8B:
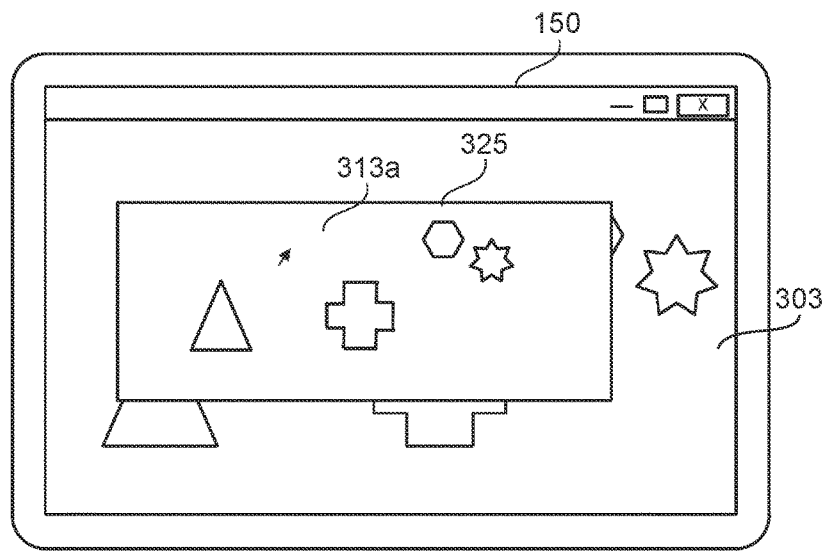
FIG. 8B is a top-down view illustrating another embodiment of an electronic device.
Figure 9A:
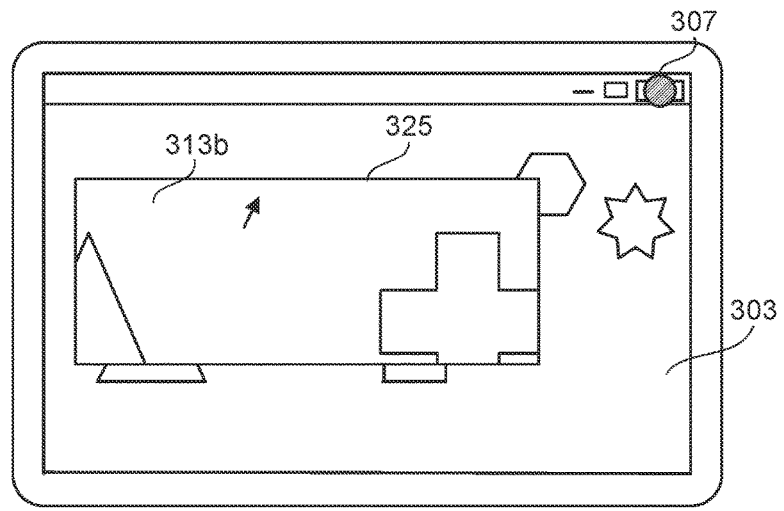
FIG. 9A is a top-down view illustrating one embodiment of an electronic device.
Figure 9B:
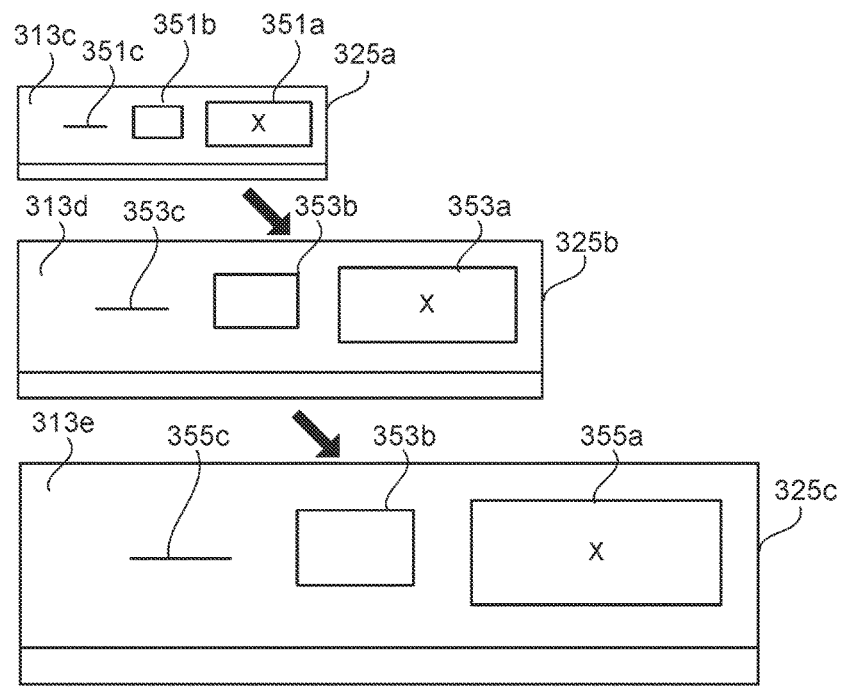
FIG. 9B is a schematic block view illustrating one embodiment of flick window.

In block 651 of FIG. 4, in one embodiment, the partial image control section 207 may recognize the direction of the flying flick operation. Processing for the direction of the flying flick operation may follow block 607. As an example, as illustrated in FIG. 8A, the partial image control section 207 may define direction 321 and direction 323 in the Y-axis direction. As depicted in FIG. 8B, the partial image control section 207 may associate the generation of a reduced partial image 313a with the direction 321. As depicted in FIG. 9, the partial image control section 207 may associate the generation of an enlarged partial image 313b with the direction 323. Although the start coordinates 306 may be located in a position corresponding to an operated object or in a position not corresponding thereto, in this example the start coordinates 320 are located in FIG. 8A in a position where no operated object of the original image 303 exists.

In certain embodiments, the partial image 313a and the partial image 313b may include reduced/enlarged images of a predetermined area of the original image 303 with the start coordinates 320 as the center. In block 653, the partial image control section 207 may determine the size and shape of the flick window 325. The procedure may follow the procedure in block 609. In block 655, the partial image control section 207 may determine the coordinates of the flick window 325. The procedure at this time may proceed to or follow the procedure of block 611.

In block 657, in response to the direction of the flying flick operation with respect to the start coordinates 306 being the direction 321, the partial image control section 207 may generate data on the reduced partial image 313a illustrated in FIG. 8B. In one embodiment, in response to the direction of the flying flick operation with respect to the start coordinates 306 being the direction 323, the partial image control section 207 may generate data on the enlarged partial image 313b as illustrated in FIG. 9. The procedure for determining the scales of reduction and enlargement of the partial images 313a and 313b may follow the procedure in block 613.

In block 631, in certain embodiments, the partial image control section 207 may detect repeated flying flick operations. In one example, the partial image control section 207 may associate the generation of the reduced partial image data with the direction 321 as illustrated in FIG. 8A. The partial image control section 207 may associate the generation of the enlarged partial image data with the direction 323 as illustrated in FIG. 9.

In one embodiment, the partial image control section 207 may recognize the direction of the first flying flick operation in block 633 to determine reduction or enlargement. Processing for the direction of the flying flick operation may follow block 607. The partial image control section 207 may determine the size and shape of the flick window 325 in block 635 from the first flying flick operation. The partial image control section 207 may determine the coordinates of the flick window 325 in block 637. The procedure may follow the procedure in blocks 609 and 611.

In block 639, in some embodiments, the partial image control section 207 may recognize subsequent flying flick operations. In response to recognizing the direction 323, the partial image control section 207 may generate, in block 641, image data for displaying a partial image 313d, 313e in a flick window 325b, 325c. As illustrated in FIG. 10A, a partial image 313d, 313e may be made larger than a partial image 313c, 313d of the previous flick window 325a, 325b each time the user performs a subsequent flying flick operation performed within a predetermined length.

Recognizing the direction 321 may include the partial image control section 207 generating image data for displaying a partial image in the flick window 325. The partial image control section 207 may make the partial image smaller than the previous partial image each time the user performs a subsequent flying flick operation within the predetermined length of time. In some embodiments, the sizes of the flick windows 325a to 325c may be fixed to change only the scale of the partial image. In response to setting the repeated flying flick operation, the partial image control section 207 may transfer, in block 615, data on a reduced or enlarged partial image with a magnification varied on a step-by-step basis to the image data synthesis section 205 each time the user performs a flying flick operation.

While embodiments have been described with reference to a specific embodiment illustrated in the drawings, the present disclosure is not limited to the embodiments illustrated in the drawings. Various configurations may be employed in accordance with the effects of the present disclosure.

What is claimed is:

1. An electronic device comprising:
    a display having X and Y display coordinates corresponding to a position on a touchscreen surface of the display;
    a proximity sensor that in response to a pointing medium being in a non-contact state of proximity to the touchscreen surface, with an original image displayed on the display, generates one or more proximity coordinates of the pointing medium comprising the X and Y display coordinates below the pointing medium in a Z direction and a Z coordinate corresponding to a distance of the pointing medium above the touchscreen surface of the display;
    a touch sensor that generates one or more contact coordinates of the pointing medium in response to the pointing medium being in a state of contact with the surface of the display;
    a partial image control section that in response to the pointing medium being in the non-contact proximity state, generates and displays an image of a spot centered at the X and Y display coordinates and further generates and displays on the display a partial image comprising an enlarged predetermined area of the original image superimposed on the original image in response to recognizing, from the proximity coordinates, a flying flick operation of the pointing medium in the proximity state, the flying flick operation being a movement having start coordinates corresponding to the X and Y coordinates of the spot and moving in a single XY direction for a shorter distance and at a faster speed than a swipe operation; and
    a contact coordinate processing section that outputs one or more contact coordinates of the partial image as contact coordinates of the original image to a user function.

2. The electronic device of claim 1, further comprising:
    a touch panel comprising the proximity sensor and the touch sensor; and
    a touch screen comprising the display and the touch panel.

3. The electronic device of claim 1, wherein the one or more contact coordinates output by the contact coordinate processing section correspond to a flick operation performed on the original image with the pointing medium in the contact state.

4. The electronic device of claim 1, further comprising a pointing device that generates an event to control a mouse cursor displayed by the original image.

5. The electronic device of claim 1, wherein the partial image control section sends an event to the user function, the event comprising changing a display of an operated object of the original image in response to the pointing medium in the proximity state being positioned in the Z direction just above the operated object.

6. The electronic device of claim 1, wherein the partial image control section stops generating the partial image in response to a predetermined time elapsing since the pointing medium moved into a separation state after the display displayed the partial image.

7. The electronic device of claim 1, wherein the partial image control section displays an operated object displayed in the partial image corresponding to an operated object of the original image around the operated object displayed in the original image.

8. The electronic device of claim 1, wherein the partial image control section determines a position of the partial image relative to the original image based on a moving direction from start coordinates of the flying flick operation.

9. The electronic device of claim 1, wherein the partial image control section determines a magnification of the partial image relative to the original image based on a moving direction from start coordinates of the flying flick operation.

10. The electronic device of claim 1, wherein the partial image control section determines a magnification of the partial image relative to the original image based on a movement characteristic of the pointing medium performing the flying flick operation, the movement characteristic selected from a group consisting of a moving speed and a moving acceleration.

11. The electronic device of claim 1, wherein the partial image control section determines a magnification of the partial image relative to the original image based on the flying flick operation beginning at first X and Y start coordinates above the spot in the Z direction and moving to end at second X and Y coordinates, the flying flick operation being repeatedly performed at most at a predetermined time interval to successively change the magnification.

12. The electronic device of claim 1, wherein the partial image control section sets at least one of a shape and a size of the partial image based on an arrangement of a plurality of operated objects of the original image.

13. A method comprising:
    detecting one or more proximity coordinates of a pointing medium that is in a state of proximity to a display having X and Y display coordinate with an original image displayed on the display, the proximate coordinates comprising the X and Y display coordinates just below the pointing medium in a Z direction;
    detecting a flying flick operation performed a selected number of times from the one or more proximity coordinates of the pointing medium in the proximity state, the flying flick operation being a movement beginning at a first XY proximity coordinate, moving in a single XY direction for a shorter distance and at a faster speed than a swipe operation, and ending at a second XY proximity coordinate;
    displaying a partial image comprising an enlarged predetermined area of the original image, wherein displaying the partial image comprises superimposing the partial image on the original image in response to the detection of the flying flick operation and wherein a magnification for the partial image is based on the single XY direction of the flying flick operation and the selected number of times the flying flick operation is performed; and
    outputting one or more contact coordinates of the partial image as contact coordinates of the original image to a user function.

14. The method according to claim 13, further comprising;
    detecting a contact flick operation performed on the display with the pointing medium, the pointing medium being in a contact state of the display; and
    performing processing on the original image in response to the detection of the contact flick operation.

15. The method according to claim 13, further comprising:
    performing a touch operation on an operated object of the original image without performing the flying flick operation; and
    performing processing on the operated object without displaying the partial image.

16. The method according to claim 13, further comprising:
    extracting movement information from the flying flick operation being performed a selected number of times; and
    determining, based on the movement information, at least one of a size, a shape, and coordinates of the partial image relative to the original image.

17. A program product comprising a non-transitory computer readable storage medium that stores code executable by a processor, the executable code comprising code to:
    display an original image comprising an operated object on a display having a touchscreen surface;
    display an image of a spot centered at an XY display coordinate of the display just below the pointing medium in the Z direction in response to detecting a pointing medium being in a non-contact state of proximity to the;
    detect one or more proximity coordinates of a pointing medium moving in an XY direction at a speed of at least a predetermined value in a state of proximity at a Z coordinate above the touchscreen surface of the display, the predetermined value being of a speed exceeding that of a swipe operation;
    display a partial image comprising an enlarged predetermined area of the original image superimposed on the original image in response to the detection of the proximity coordinates, wherein the partial image comprises the operated object; and
    outputting one or more contact coordinates of the partial image as contact coordinates of the original image to a user function.

18. The program product of claim 17, further comprising code to:
    detect a contact flick operation performed on the display with the pointing medium, the pointing medium being in a contact state of the display; and
    perform processing on the original image in response to the detection of the contact flick operation.

* * * * *